US006705539B1

United States Patent
Bien

(10) Patent No.: US 6,705,539 B1
(45) Date of Patent: Mar. 16, 2004

(54) SPRAY GUN/APPLICATOR

(76) Inventor: Frank C. Bien, 1239 W. Newport Center Dr., Suite 101-104, Deerfield Beach, FL (US) 33442

( * ) Notice: Subject to any disclaimer, the term of this patent is extended or adjusted under 35 U.S.C. 154(b) by 30 days.

(21) Appl. No.: 10/072,325

(22) Filed: Feb. 7, 2002

(51) Int. Cl.[7] .................................................. A62C 5/02
(52) U.S. Cl. ...................... 239/10; 239/413; 239/414; 239/432; 239/505; 239/527; 239/532; 239/288
(58) Field of Search ............................... 239/1, 10, 119, 239/288, 413, 414, 432, 433, 505, 513, 514, 530, 532, 527

(56) References Cited

U.S. PATENT DOCUMENTS

| 4,193,546 A | * | 3/1980 | Hetherington et al. | ...... 239/413 |
| 4,262,847 A | * | 4/1981 | Stitzer et al. | ............... 239/432 |
| 5,429,308 A | * | 7/1995 | Brown | ........................ 239/414 |
| 5,810,254 A | * | 9/1998 | Kropfield | .................... 239/432 |

* cited by examiner

Primary Examiner—Steven J. Ganey
(74) Attorney, Agent, or Firm—Malin, Haley & DiMaggio, P.A.

(57) ABSTRACT

An applicator is provided which through the use of valve assemblies and separate first and second tubing member delivers two separate materials separately to a mixing head. The mixing head is provided with two separate passageways which terminate into an outlet passageway. To help create equal pressure between the materials at the point where the materials meet, an impinger can be placed in one or both of the mixing head passageways. Material flowing into each mixing head passageway first meet and are mixed in the outlet passageway. A tip is attached to the mixing head and a static mixer can be disposed within the tip for further mixing of the combined materials prior to their application out of the tip onto the intended surface. Material is supplied to the valve assemblies by various methods such as hoses.

23 Claims, 5 Drawing Sheets

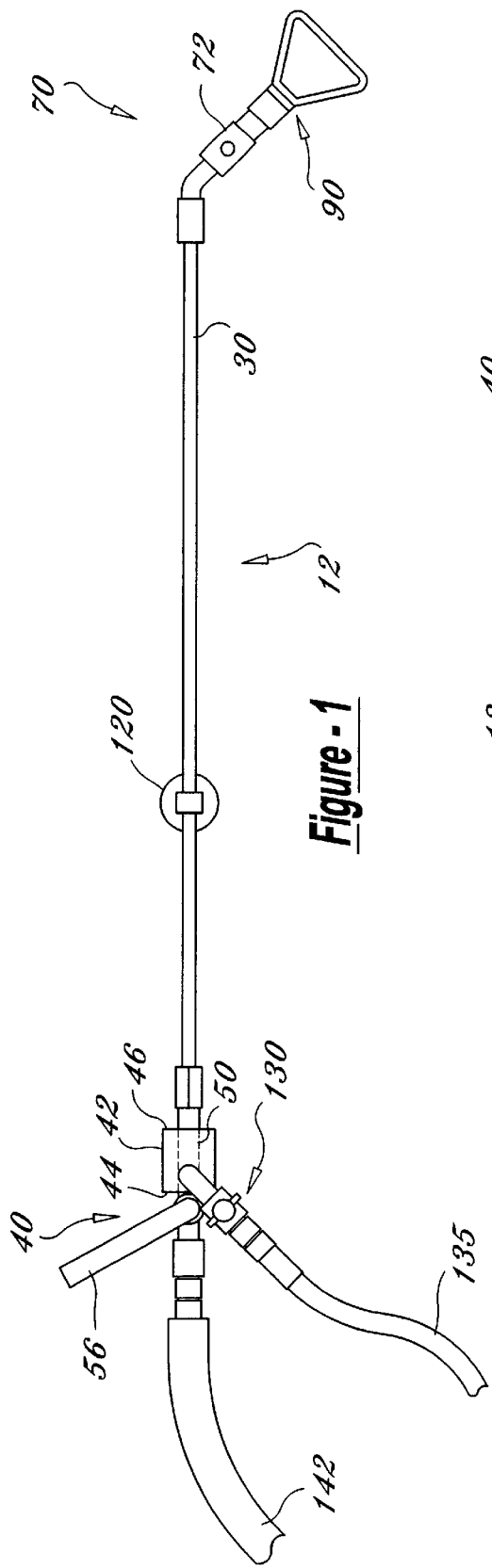
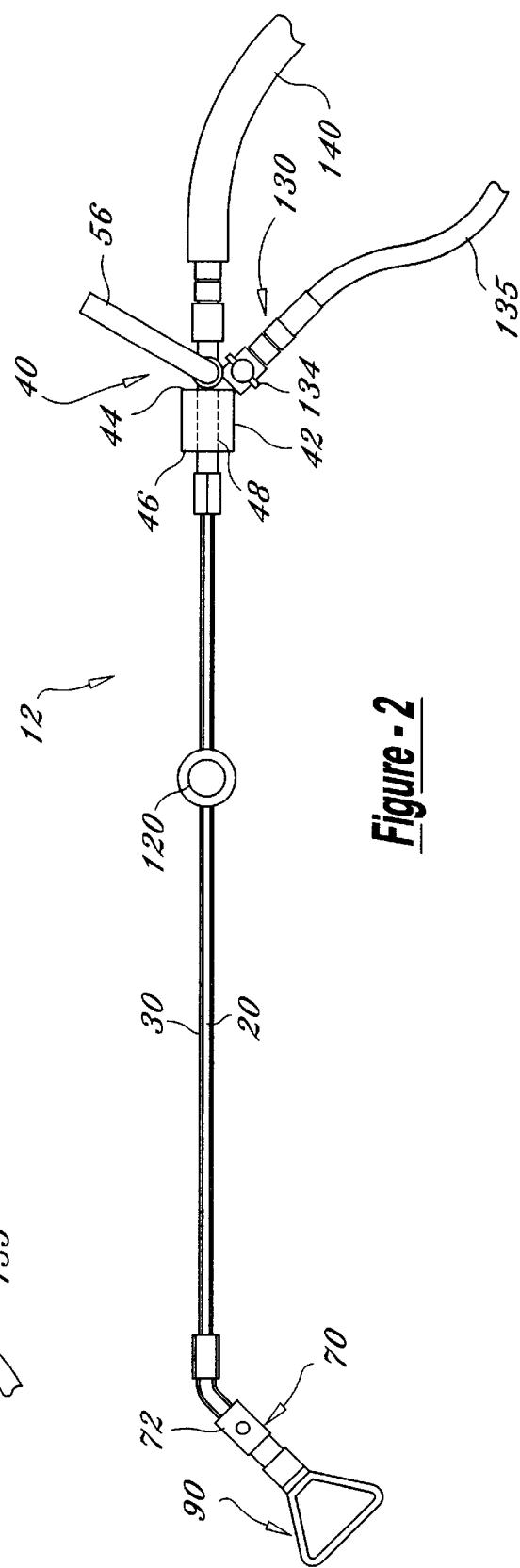

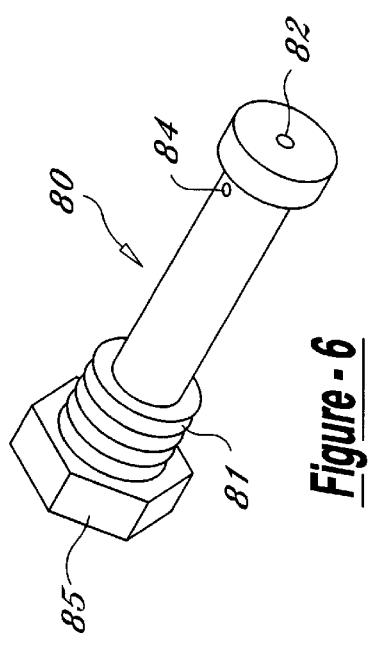
Figure - 6
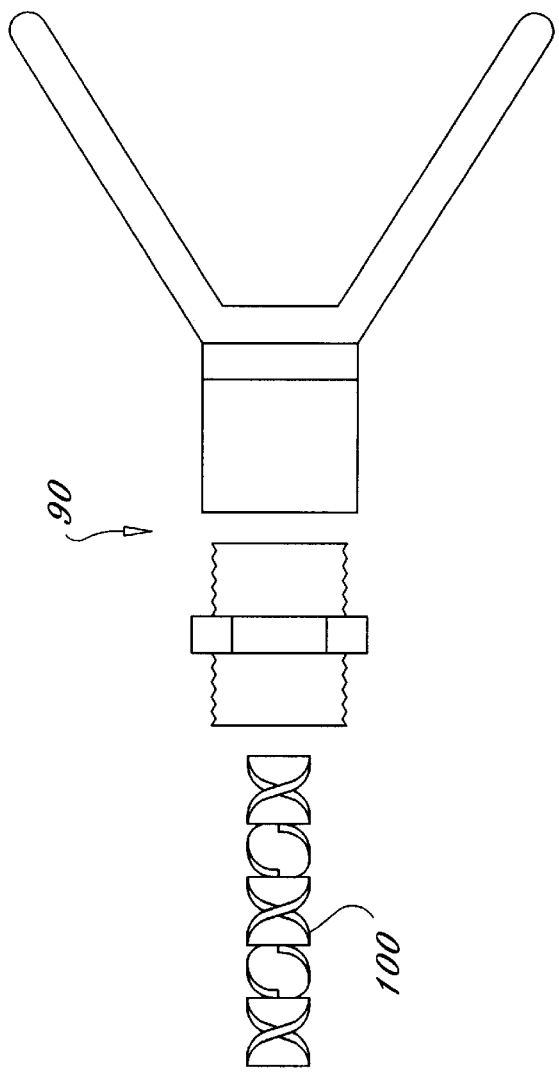
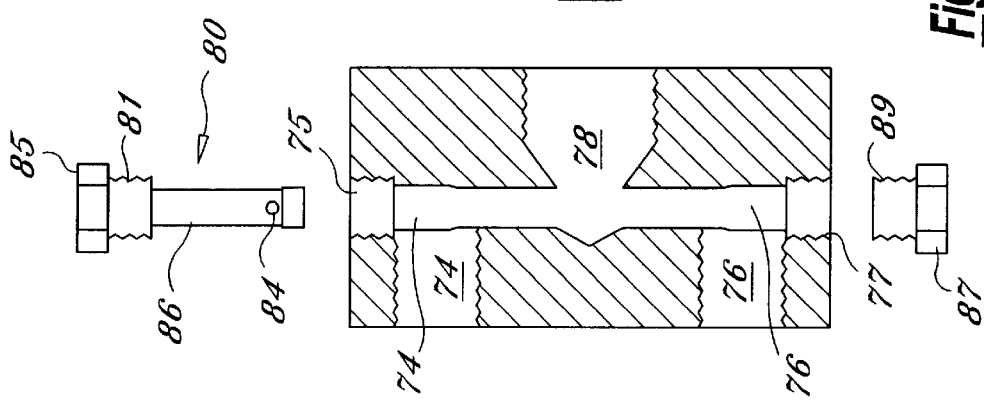
Figure - 5

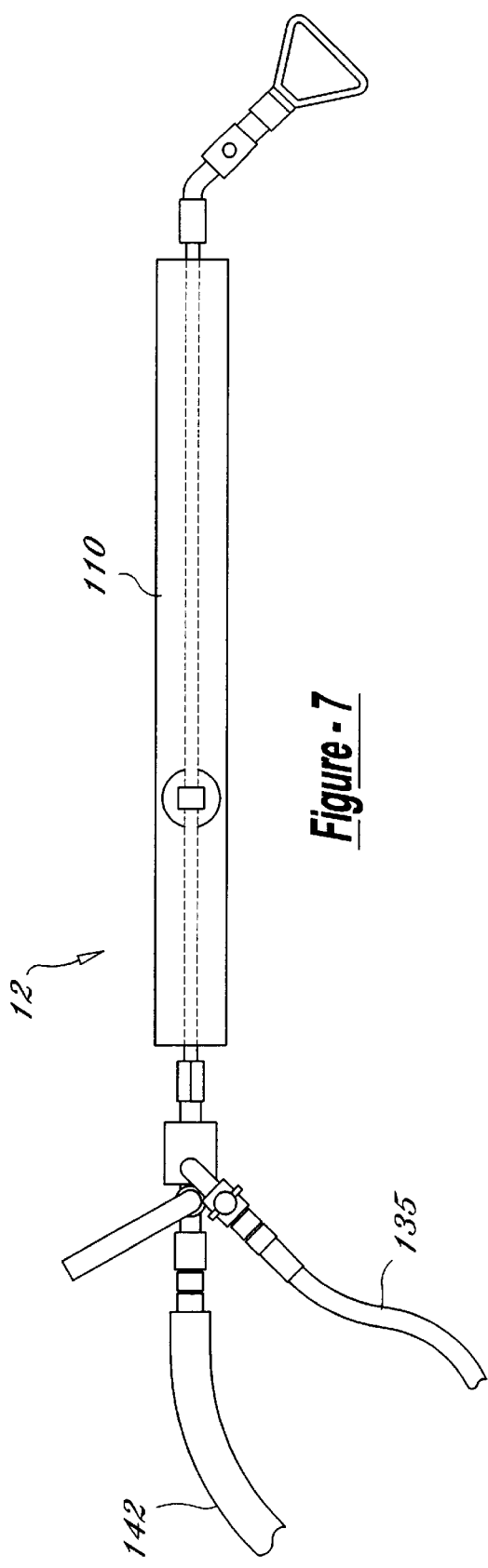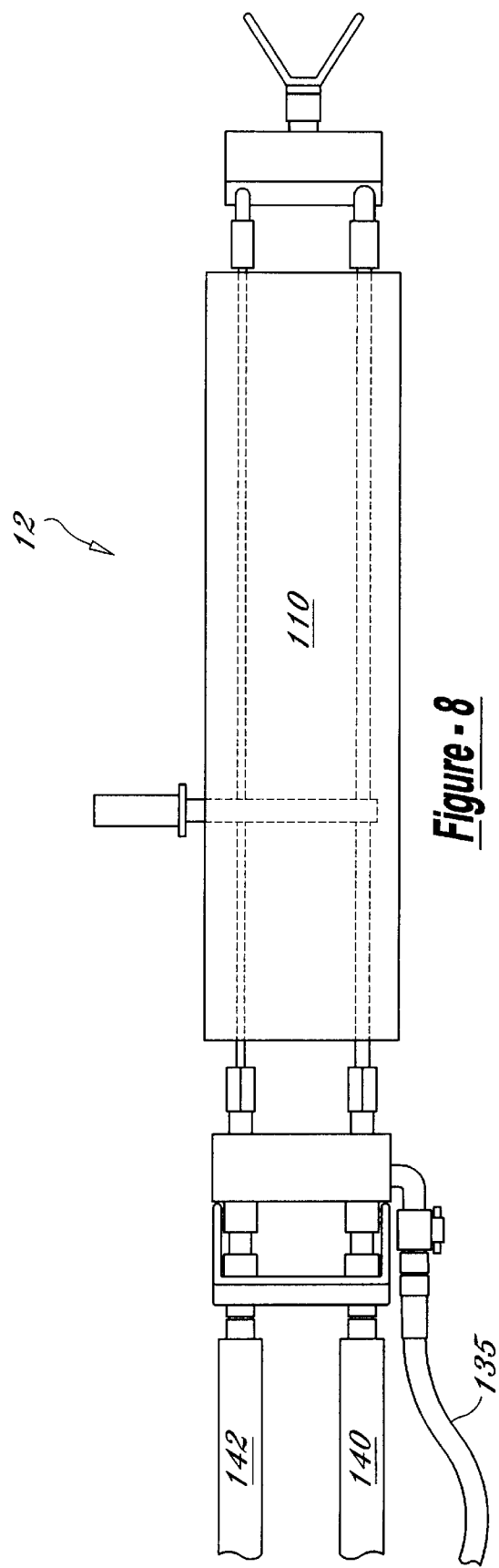

SPRAY GUN/APPLICATOR

FIELD OF INVENTION

This invention relates to spray guns and spray applicators, and more particularly to a spray gun or spray applicator which mixes a plurality of materials just prior to application to a surface.

BACKGROUND OF THE INVENTION

Spray guns or applicators ("spray guns") are often used with applicator assemblies for supplying material(s) generated by the assembly to the intended surface (i.e. roof, concrete, pavement, etc.). However, prior spray guns have been relatively heavy and bulky requiring operation in a non-ergonomic correct position, with the result of potential injury to a user, especially after prolonged use. Typical spray guns also incorporate a trigger mechanism, thus, requiring constant pressure by the user to maintain such spray guns in an "on" position. Prior spray guns have also failed to provide superior mixing functions when used with to apply a multiple material composition. Thus, what is needed in the art is a spray applicator which is ergonomically superior to prior spray guns and which also produces a superior mix between the materials of the composition, as compared to the mix generated by previous spray guns. It is, therefore, to the effective resolution of the aforementioned problems and shortcomings of the prior art that the present invention is directed.

SUMMARY OF THE INVENTION

The present invention preferably comprises an extended pole applicator which can include a manifold having a first valve assembly and a second valve assembly and a handle connected to the valve assemblies. A first tubing is associated with the first valve assembly and a first passageway extending through the valve manifold. A second tubing is associated with the second valve assembly and a second passageway extending through the valve manifold. The opposite end of the first tubing is attached to a mixing head and associated with a first port/passageway in the mixing head, while the opposite end of the second tubing is attached to the mixing head and associated with a second port/passageway in the mixing head. An impinger can be placed in one or both of the mixing head passageways. Both mixing head passageways terminate into and communicate with a mixing head outlet passageway where material flowing into each mixing head passageway first meet and are mixed. A spray tip/nozzle is attached to mixing head and is in communication with the outlet passageway. A static mixer can be disposed within the spray tip/nozzle for further mixing of the combined materials prior to application out of the spray tip/nozzle. Material is supplied to the valve assemblies by various methods such as hoses and heated hoses.

In use with the user preferably locks the valve handle into an "on" position to open the ball valves which causes a first material to flow from a first hose attached to the first valve into a first manifold passageway and a second material to flow from a second hose attached to the second valve into a second manifold passageway. The first material travels through the first tubing, while the second material travels separately through the second tubing. The first material enters the first mixing passageway, while the second material enters second mixing passageway. The first material enters an aperture of an impinger disposed in the first mixing passageway and exits the impinger from a second aperture into the mixing head's outlet passageway. The second material exits second mixing passageway also into mixing head outlet passageway where it meets the first material. The two materials preferably enter the outlet passageway at essentially the same amount of pressure and begin to mix together. The combined material then begins to travel through the outlet passageway where it preferably confronts the static mixer which further mixes the materials together. After further mixing by the static mixer, the combined material exits out of the tip/nozzle and is applied to its intended surface.

It is therefore an object of the present invention to provide an applicator which provides for superior mixing of materials just prior to application to an intended surface.

It is another object of the present invention to provide an applicator which is configured and structured to potentially reduce ergonomic related problems found with conventional spray gun applicators.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a right side elevational view of the present invention applicator;

FIG. 2 is a left side elevational view of the invention shown in FIG. 1;

FIG. 5 is an exploded sectional view of the mixing head/nozzle portion of FIG. 4;

FIG. 6 is an isometric view of the an impinger in accordance with the present invention;

FIG. 7 is a right side elevational view of the invention shown in FIG. 1 further including a protective guard member;

FIG. 8 is a top view of the invention shown in FIG. 1 further including the protective guard member;

DETAILED DESCRIPTION OF THE PREFERRED EMBODIMENT

Figure 3:
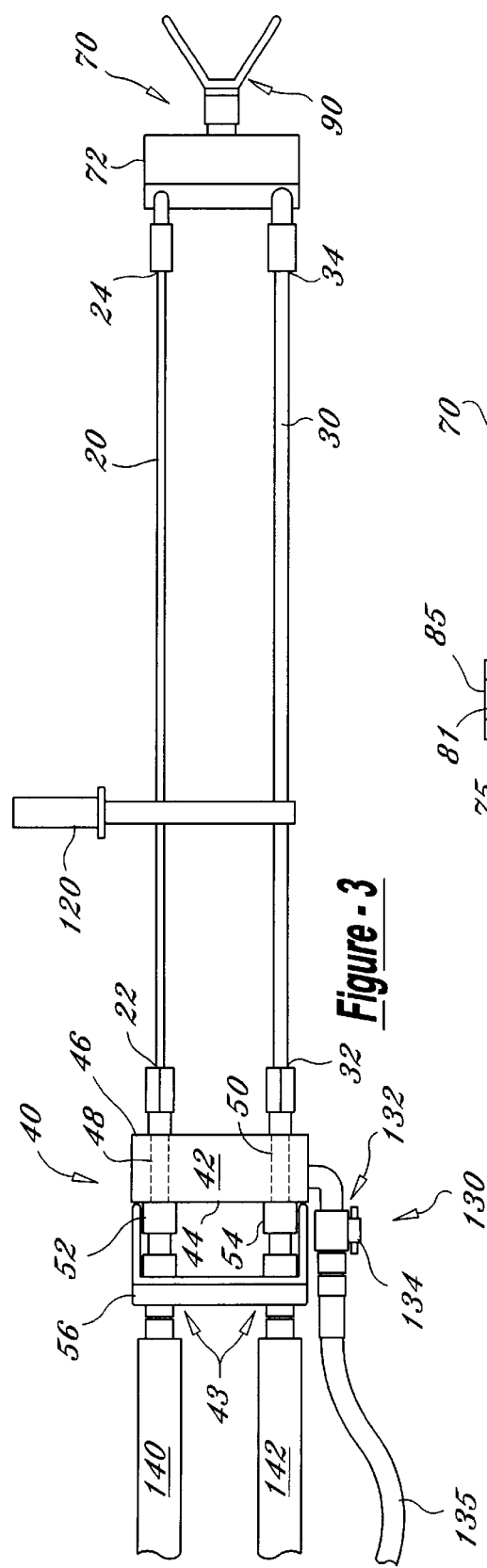
FIG. 3 is a top view of the invention shown in FIG. 1.
Figure 4:
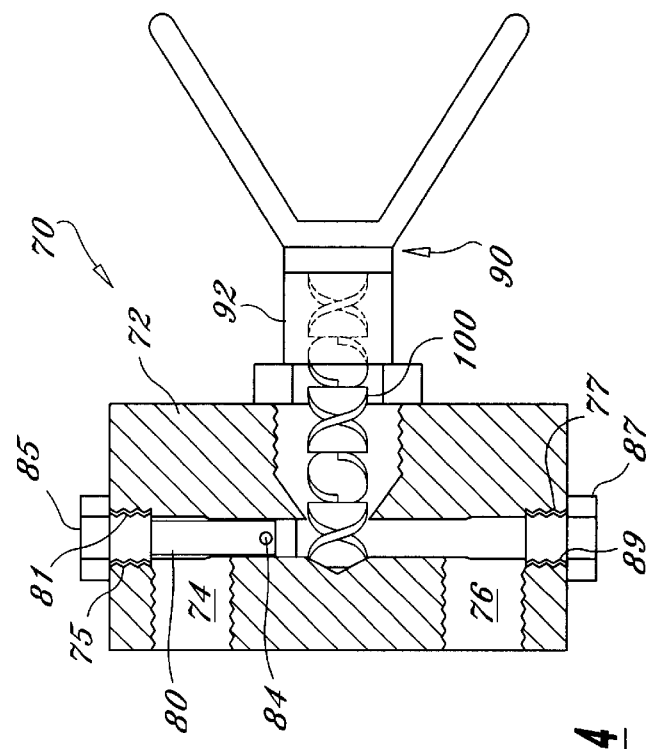
FIG. 4 is a sectional view of the mixing head/nozzle portion of the present invention applicator.
Figure 10:
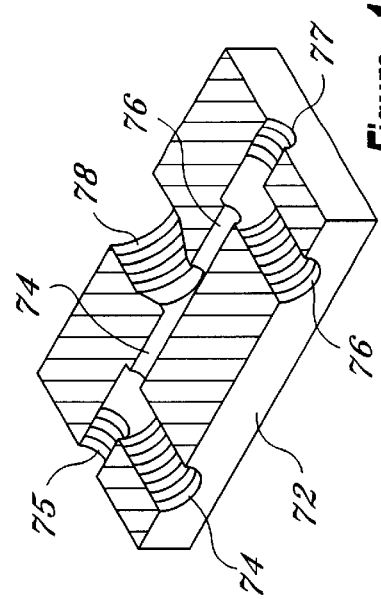
FIG. 10 is a sectional isometric view of the mixing head portion of the present invention.
Figure 11:
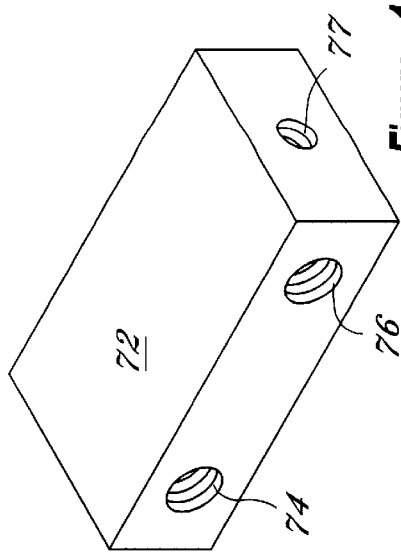
FIG. 11 is a isometric view of the mixing head portion of the present invention.

As seen in the drawings the present invention provides a pole gun, sprayer or applicator (collectively referred to as "applicator") which is generally designated as reference numeral 12. Applicator 12 generally includes a first material passageway 20 having a first end 22 and a second end 24, a second material passageway 30 having a first end 32 and a second end 34, means 40 for restricting material flow into first material passageway 20 and second material passageway 30, and a means 70 for mixing and spraying materials traveling through first material passageway 20 and second material passageway 30.

First material passageway 20 and second material passageway 30 can be tube-like members, either flexible or rigid. In one embodiment, passageways 20 and 30 are stainless steel tubes or pipes, though such is not considered limiting, and other materials can be used and are considered within the scope of the invention. For purposes of this description and the claims, whether flexible or rigid and regardless of material used for construction, passageways 20 and 30 will be referred to as "tubing" or "material passageways" to collectively refer to all variations.

In one embodiment said means for restricting material flow 40 can comprise a valve manifold 42 having a first side 44 and a second side 46 in connection with an on/off valve assembly 43. A first passageway 48 and second passageway 50 can extend through manifold 42 from first side 44 to second side 44. The first ends of tubing 20 and 30 are preferably connected to passageways, 48 and 50, respectively, by conventional means such a pipe connectors or fittings (e.g. compression fittings) which are preferably threaded into, or otherwise attached to manifold 42 to provide fluid or material communication between passageways 48 and 50 and tubing 20 and 30, respectively. Alternatively, the first ends of tubing 20 and 30 can be directly attached to manifold 42 by providing threads at the first ends or by some other conventional connection method (i.e. soldering, welding, etc.). Depending on one or more considerations such as, but not limited to, specific proportions between the materials flowing through tubing 20 and 30 for the final composition sprayed or otherwise outputted out a tip/nozzle 90, flow rates for the materials, viscosity and heat of the materials, pressure, etc., the diameter of tubing 20 and 30 can be the same or different. Thus, as best seen in FIG. 3, the diameter of tubing 20 or 30 can be larger in diameter than the other tubing, though such is not considered limiting.

On/off valve assembly 43 preferably consist of a first on/off valve 52 and a second on/off valve 54 controlled by a handle 56. On/off valves 52 and 54 can be conventional ball valves, though other valves that can provide on/off characteristics can also be used and are considered within the scope of the invention. Though not preferred, it is possible that manifold 42 can be eliminated and that tubing 20 and 30 are directly connected to on/off mechanisms such as valves 52 and 54. Handle 56 is connected to both valves 52 and 54 and can be positioned such that valves 52 and 54 are open or closed. The nature of handle 56 allows it to lock and automatically maintain its valve open or closed position without continuous pressure or force by the user. Thus, ergonomic concerns found with gun/trigger mechanisms due to the required continuous application of pressure by the user are eliminated. However, it should be recognized that a trigger/mechanism could be substituted for handle 56 to operate valves 52 and 54 though such is not obviously preferred.

As best seen in FIGS. 4, 5, 10 and 11, means for mixing and spraying 70 preferably consists of a spraying/mixing head 72 and a tip/nozzle member 90. Mixing head 72 can include a first passageway 74, a second passageway 76 and an outlet passageway 78. First mixing passageway 74 is preferably in communication with first material passageway 20 and second mixing passageway 76 is preferably in communication with second material passageway 30. First mixing passageway 74 has a first inlet end associated with tubing 20 and a second outlet end associated with outlet passageway 78. Second mixing passageway 76 has a first inlet end associated with tubing 30 and a second outlet end associated with outlet passageway 78. First mixing passageway 74 and second mixing passageway 76 are in communication with outlet passageway 78. Though not limiting first mixing passageway 74 and second mixing passageway 76 can be partially threaded (e.g. ¼" pipe thread, etc.) at their first inlet ends for directly mating with tubing 20 and 30 (i.e. where tubing 20 and 30 have one or more threaded ends), respectively, or for mating with connectors or fittings (e.g. conventional plumbing elbows, 45s, compression fittings, etc.) used to attached tubing 20 and 30 to mixing head 72.

Tip/nozzle member 90 can be any conventional tip or nozzle member such as, but not limited to a Reverse-A-Clean (RAC) Tip made by Graco. Tip member 90 includes an internal passageway 92, which is in communication with outlet passageway 78 for spraying material received and mixed within outlet passageway 78. Preferably, though not limiting, the outer end of outlet passageway 78 is threaded (e.g. pipe thread ¾", etc.) for mating with threads of tip 90 to removably connect tip 90 to mixing head 72.

Mixing head 72 can also include a means for controlling a rate of flow of a material within first mixing passageway 74. In one embodiment the means for controlling can be at least one impinger 80 (FIG. 6) having a first end, a second end and an intermediate portion therebetween. Impinger 80 including a first aperture 82 disposed at its second end and a second aperture 84 disposed at its intermediate portion. The body member of impinger 80 defines an internal passageway 86, wherein a first end of internal passageway 86 terminates at first aperture 82. The second end of impinger 80 has a diameter that can be preferably larger that the diameter of impinger 80 at its intermediate portion. Depending on materials used (including heat and viscosity considerations), pressure desired, flow rates, etc., a second impinger (not shown) can be provided for controlling the rate of flow of material entering second mixing passageway 76.

Mixing head 72 can include a first aperture 75, preferably at least a portion thereof threaded, extending from a first side of mixing head 72 to an intermediate position of first mixing passageway 74. First aperture 75 is in communication with first mixing passageway 74. A second aperture 77, a having at least a portion thereof preferably threaded, can extending from an opposite side of mixing head 72 to an intermediate portion of second mixing passageway 76. Second aperture 77 is in communication with second mixing passageway 76.

Impinger 80 is preferably disposed within first aperture 75 and a portion of first mixing passageway 74. The diameter of the second end of impinger 80 is chosen such that it effectively seals communication between first mixing passageway 74 and outlet passageway 78. The diameter of the second end of impinger 80 is slightly smaller than a diameter of first mixing passageway 74 at its second end such that a seal is created at the second end of first mixing passageway 74 (See FIG. 4). Any material flowing into first mixing passageway 74 from tubing/first material passageway 20 is directed through second aperture 84 of impinger 80 (due to the smaller diameter of the intermediate portion of impinger 80 as compared to the diameter of its second end) and into internal passageway 86 of impinger 80 and out of first aperture 82 into said outlet passageway 78. Where a second impinger is provided it is similarly disposed within second aperture 77 and a portion of second mixing passageway 76 of mixing head 72. Preferably, a portion of impinger 80 is threaded at 81 for mating with threads of aperture 75 and/or 77. Where no impinger 80 is needed in first mixing passageway 74 or second mixing passageway 76, a cap 87, preferably having threads 89, can be provided at aperture 75 and/or 77, to effectively seal the opening. Where no impinger 80 will ever be needed, then mixing head 72 can be provided without apertures 75 and 77. Impinger 80 can also include a head portion 85 which also acts as a stop member when attaching impinger 80 to mixing head 72.

The size of first impinger aperture 82 can be chosen, along with other rate of flow considerations, to ensure that the amount of pressure for material flowing into outlet passageway 78 from impinger internal passageway 86 is essentially equal (i.e. substantially balanced) to the amount of pressure for material flowing into outlet passageway 78 from second mixing passageway 76. In one embodiment, impinger aperture 82 can have an orifice diameter of approximately 0.035", though such is not considered limiting, and other dimensions can be used and are considered within the scope of the invention. The essentially equal or balanced pressure helps to prevent either material from exerting a relatively higher force on the other material which could effect the desired flow of the materials for mixing together in outlet passageway 78. Thus, the area of outlet passageway 78 where first mixing passageway 74 and second mixing passageway 76 terminate provides the first point where materials received from tubing 20 and 30 are mixed together. In one embodiment, the pressure of the materials entering outlet passageway 78 from impinger aperture 82 and second mixing passageway 76 can be approximately 500 p.s.i., though such value is not considered limiting and other values can be selected and are considered within the scope of the invention.

The dimensions for first mixing passageway 74, second mixing passageway 76 and outlet passageway 78 are not considered limited to any specific dimensions. In one embodiment, passageways 74 and 76 can provide an approximate orifice diameter of 0.250", though such is not considered limiting.

Mixing head 72 can be constructed from various materials such as aluminum, steel, metal, stainless steel, etc. and is not considered limited to any one specific material. Similarly, valve manifold 42 can also be constructed from various materials such as aluminum, steel, metal, stainless steel, etc. and is not considered limited to any one specific material. Tubing 20 and/or 30 can vary in length (such as, but not limited to, approximately 12" to approximately 48", though other dimensions are also possible) and in diameter (e.g. ¼", ½", ¾", ⅜", 3/16", etc.). Thus, device 12 and/or tubing 20 and/or 30 is not limited to any one specific length and/or size, or any specific range of lengths and/or sizes. The material used to construct tubing 20 and/or 30 can be stainless steel, though other materials can be used and are also considered within the scope of the invention, such as, but not limited to, aluminum, metal, steel, etc.

A static mixer 100 can be disposed within at least a portion of internal passageway 92 of tip member 90 for further mixing of the materials entering outlet passageway 78 prior to their spraying or otherwise deliver to the intended surface (i.e. roof, concrete, wood, steel, metal, etc.). Static mixer 100 can be constructed from various materials such as steel, metal, stainless steel, aluminum, plastic, etc. and all are considered within the scope of the invention. The specific dimensions for static mixer 100 are not considered limiting. In one embodiment, such dimension can be approximately 0.375" in diameter and 1.5" long, though such is given by way of example and not considered limiting.

It should be understood for purposes of the description and claims, the term "material" when discussing a material flowing through tubing 20 and/or 30 and/or first mixing passageway 74 and/or second mixing passageway 76 is defined to be a single material or a combination of one or more materials previously mixed prior to deliver to tubing 20 and/or 30.

Applicator 12 can also include a guard member, such as an elongated metal guard 110 which can be attached to tubing 20 and/or 30 be a bridge member (See FIGS. 7 and 8). Guard 110 can be constructed from other materials such as wood, plastic, etc. in addition to metal and all are considered within the scope of the invention. Guard 110 is provided to help prevent contact between tubing 20 and 30 and the user, as tubing 20 and/or 30 may heat to a high temperature based on the temperature of the materials flowing through tubing 20 and/or 30. In lieu of or in addition to guard 110, tubing 20 and/or 30 may be directly covered with a sleeves (not shown) which can withstand and not transfer potential high temperatures of tubing 20 and/or 30.

As seen in the figures, applicator 12 can also be provided with a handle member 120 which is attached to an intermediate point along tubing 20 and/or 30 for ease in handling applicator 12 by the user. In lieu of or in addition to a handle (not shown) can be formed as an extension of guard 110. Additionally, a handle can be attached to guard 110 instead of tubing 20 and/or 30 by conventional means.

One or more flush lines 130 can also be provided to help internally clean manifold 42, valves 52 and/or 54, tubing 20 and/or 30, and/or mixing head 72, as well as any connectors or fittings (e.g. compression fittings) used to connect these components together. Each flush line(s) 130 can be preferably attached to valve manifold 42 by a flush valve 132 assembly attached to manifold 42 (e.g. at a side orifice of manifold 42). Each orifice 43 intersects and communicates with one of the manifold passageways 48 or 50. A handle or switch 134 is preferably provided to operate flush valve 132 to either an "on" (open) or "off" (closed) position. Flush line 130 includes a hose 135 connected at one end to flush valve 132. The other end of hose 135 is associated with a cleaning fluid or material, such as a base reactive material and/or mineral spirits supplied at high pressure such as approximately 500 p.s.i., though such value is not considered limiting.

Valve assemblies 52 and 54 are each preferably provided with threaded ends 53 and 55, respectively, for mating and connecting of hoses, heated hoses, lines, tubing, pipes, etc. (collectively referred to as "hoses" 140) for receiving material into passageways 48 and 50, respectively. Other devices or methods for attaching hoses to valve assemblies. 52 and 54 can be used and are considered within the scope of the invention.

Applicator 12 can achieve and be used for various ratios and/or flow rates by using or not using impinger 80 and/or cap 87 and/or by the changing of dimensions for impinger 80, mixing passageways 74 and/or 76, and/or tubing 20 and/or 30. Mixing passageways 74 and 76 can be provided with common threads and orifices. Depending on application, such as a spraying application, both or one of mixing passageways 74 and/or 76 can be restricted for high pressure impingement with or without static mixer 100. For applications such as low pressure, high volume injections and/or pour applications, both mixing passageways 74 and 76 can be unrestricted (i.e. no impinger 80, caps 87 only).

Applicator 12 can be used for a variety of multiple materials and applications for preferably two and three component reactive materials. Other number component reactive materials can also be used with Applicator 12. It is also within the scope of the invention to provide additional material passageway members (tube/pipe), impingers, and/or mixing head passageways to permit the use of an applicator, similar to the concepts and structure of Applicator 12, with larger number of material combinations. Some of the materials that can be transferred, mixed and sprayed by Applicator 12 include, but are not limited to, bituminous materials, asphalts, polyols, polyurethanes, urethanes, isocyanates, elastomers, paints, epoxies, polyesters, foams, resins, etc.

Figure 9:
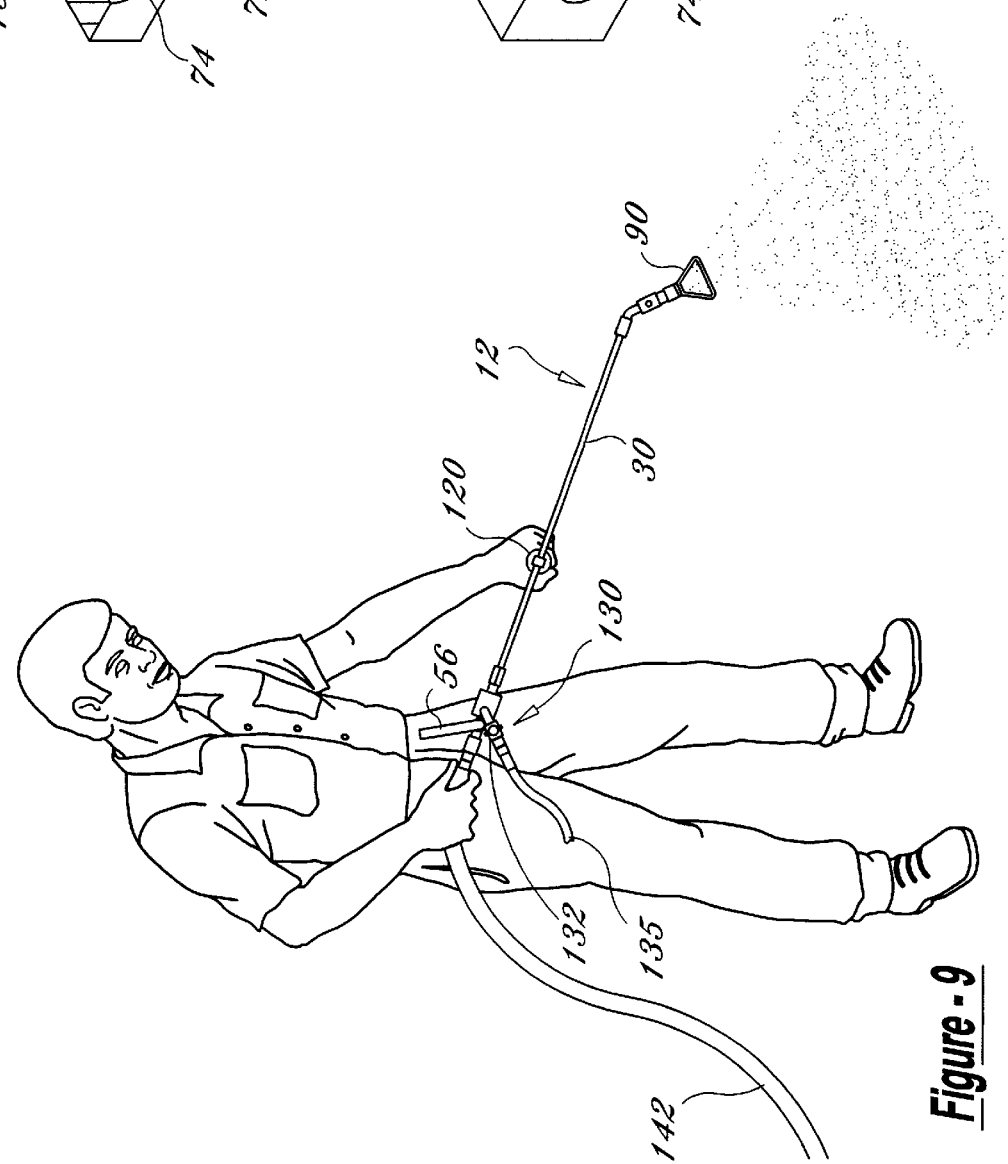
FIG. 9 is a perspective view of the invention shown in FIG. 1 in use by a user.

In use with the user preferably grabbing handle 120 (FIG. 9), handle 56 is locked into an "on" position to open valves 52 and 54 causing a first material to flow from a hose 140 attached to valve 52 into manifold passageway 48 and a second material to flow from a hose 142 attached to valve 54 into manifold passageway 50. The first material continues the solo portion of its journey through tubing 20, while the second material travels separately through tubing 30. The first material enters first mixing passageway 74, while the second material enters second mixing passageway 76. For purposes of illustration only, the remaining discussion of the use of Applicator 12 assumes that an impinger 80 is provided with first mixing passageway 74 and a cap 87 is attached to the side orifice associated with second mixing passageway 76. The first material enters impinger second aperture 84 travels through internal passageway 86 and exits impinger first aperture 82 into mixing head outlet passageway 78. The second materials exits second mixing passageway into mixing head outlet passageway 78 where it meets the first material. The two materials preferably enter outlet passageway 78 at essentially the same amount of pressure and begin to mix together. The combined material then begins to travel through outlet passageway 78 where it preferably confronts static mixer 100 which further mixes the materials together. After further mixing by static mixer 100, the combined material exits out of tip/nozzle 90 and is applied to its intended surface. Though not limiting, the structure of Applicator 12 permits its to apply the combined/mixed material at a distance of approximately 12"–18" from the intended surface which reduces or minimizes over spraying and increases efficiency.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

The instant invention has been shown and described herein in what is considered to be the most practical and preferred embodiment, and alternative embodiments thereof. It is recognized, however, that departures may be made therefrom within the scope of the invention and that obvious modifications will occur to a person skilled in the art. It is also to be understood that the following claims are intended to cover all of the generic and specific features of the invention herein described, and all statements of the scope of the invention which, as a matter of language, might be said to fall therebetween.

What is claimed is:

1. A hand-held applicator comprising:
    a first material passageway having a first end and a second end;
    a second material passageway having a first end and a second end, said second material passageway separate and independent of said first material passageway;
    means for restricting material flow into said first material passageway and said second material passageway; and
    means for mixing and spraying materials traveling through said first material passageway and said second material passageway,
    wherein said means for restricting comprises:
        a manifold having a first passageway and a second passageway, said first manifold passageway in communication with said first material passageway at a first outlet end of said first manifold passageway and said second manifold passageway in communication with said second material passageway at a second outlet end of said second manifold passageway, wherein said first outlet end and said second outlet end are separate and independent of each other; and
        an on/off assembly in communication with said manifold for restricting access to said first manifold passageway and said second manifold passageway;
    wherein said first material passageway disposed between said manifold and said means for mixing and said second material passageway disposed between said manifold and said means for mixing.

2. The applicator of claim 1 wherein said on/off assembly comprising:
    a first on/off valve in communication with said first manifold passageway;
    a second on/off valve in communication with said second manifold passageway;
    a handle connected to said first on/off valve and said second on/off valve, said handle automatically maintaining said first on/off valve and said second on/off valve in either an "on" position or an "off" position.

3. The applicator of claim 2 wherein said first on/off valve is a first ball valve and said second on/off valve is a second ball valve.

4. The applicator of claim 1 wherein said means for mixing and spraying comprising:
    a mixing head having a first passageway, a second passageway and an outlet passageway, said first mixing passageway in communication with said first material passageway, said second mixing passageway in communication with said second material passageway, said first mixing passageway and said second mixing passageway in communication with said outlet passageway; and
    a tip member in communication with said outlet passageway for spraying material received within said outlet passageway.

5. The applicator of claim 4 wherein said tip member having an internal passageway and said means for mixing further comprising a static mixer disposed within a portion of said internal passageway for further mixing of material received from said first material passageway and from said second material passageway.

6. The applicator of claim 1 wherein said first material passageway is a first tubing member extending from said means for restricting to said means for mixing and said second material passageway is a second tubing member extending from said means for restricting to said means for mixing.

7. An applicator comprising:
a first material passageway having a first end and a second end;
a second material passageway having a first end and a second end; means for restricting material flow into said first material passageway and said second material passageway;
and means for mixing and spraying materials traveling through said first material passageway and said second material passageway;
wherein said means for mixing and spraying comprising:
a mixing head having a first passageway, a second passageway and an outlet passageway, said first mixing passageway in communication with said first material passageway, said second mixing passageway in communication with said second material passageway, said first mixing passageway and said second mixing passageway in communication with said outlet passageway; and
a tip member in communication with said outlet passageway for spraying material received within said outlet passageway;
wherein said means for mixing and discharging further comprising means for controlling a rate of flow of a material within said first mixing passageway, said first mixing passageway having a first end and a second end, said first mixing passageway in communication with said first material passageway at said first end, said first mixing passageway in communication with said outlet passageway at said second end.

8. The applicator of claim 7 wherein said means for controlling comprising:
an impinger having a first end, a second end and an intermediate portion therebetween, said impinger including a first aperture disposed at said second end and a second aperture disposed at said intermediate portion, said impinger defining an internal passageway, wherein a first end of said internal passageway terminates at the first aperture of said impinger, wherein said impinger second end having a diameter larger that a diameter of said impinger intermediate portion;
wherein said mixing head having an aperture extending from a first side of said mixing head to an intermediate position of said first mixing passageway, said aperture in communication with said first mixing passageway;
wherein said impinger disposed within said mixing head aperture and a portion of said first mixing passageway.

9. The applicator of claim 8 wherein the diameter of the second end of said impinger is chosen such that it effectively seals communication between said first mixing passageway and said outlet passageway.

10. The applicator of claim 8 wherein the diameter of the second end of said impinger is slightly smaller than a diameter of said first mixing passageway at its second end such that a seal is created at the second end of the first mixing passageway and any material flowing into said first mixing passageway from said first material passageway is directed through said second aperture of said impinger into said impinger internal passageway and out said first aperture of said impinger into said outlet passageway.

11. The applicator of claim 8 wherein the size of said first impinger aperture is chosen such that an amount of pressure for material flowing into said outlet passageway from said impinger internal passageway is essentially equal to an amount of pressure for material flowing into said outlet passageway from said second mixing passageway.

12. A multiple material applicator comprising:
a first tubing member having a first end and a second end;
a second tubing member having a first end and a second end;
a manifold having a first passageway and a second passageway, said first manifold passageway in communication with said first tubing member at a first outlet end of said first manifold passageway and said second manifold passageway in communication with said second tubing member at a second outlet end of said second manifold passageway, wherein said first outlet end and said second outlet end are separate and independent of each other;
a first on/off valve in communication with said first manifold passageway;
a second on/off valve in communication with said second manifold passageway;
a handle connected to said first on/off valve and said second on/off valve, said handle being movable to a locked "open" or "closed" position to automatically maintaining said first on/off valve and said second on/off valve in either an "on"position or an "off" position;
a mixing head having a first passageway, a second passageway and an outlet passageway, said first mixing passageway in communication with said first tubing member and said second mixing passageway in communication with said second tubing member, said first mixing passageway and said second mixing passageway in communication with said outlet passageway; and
a tip member in communication with said outlet passageway for spraying material received within said outlet passageway.

13. The applicator of claim 12 further comprising a static mixer disposed within a portion of an internal passageway of said tip member for further mixing of material received from said first material passageway and from said second material passageway.

14. The applicator of claim 12 wherein said first on/off valve is a first ball valve and said second on/off valve is a second ball valve.

15. A multiple material applicator comprising:
a first tubing member having a first end and a second end;
a second tubing member having a first end and a second end;
a manifold having a first passageway and a second passageway, said first manifold passageway in communication with said first tubing member and said second manifold passageway in communication with said second tubing member;
a first on/off valve in communication with said first manifold passageway;
a second on/off valve in communication with said second manifold passageway;
a handle connected to said first on/off valve and said second on/off valve, said handle being movable to a locked "open" or "closed" position to automatically maintaining said first on/off valve and said second on/off valve in either an "on" position or an "off" position;
a mixing head having a first passageway, a second passageway and an outlet passageway, said first mixing passageway in communication with said first tubing member and said second mixing passageway in communication with said second tubing member, said first mixing passageway and said second mixing passageway in communication with said outlet passageway;

a tip member in communication with said outlet passageway for spraying material received within said outlet passageway; and an impinger having a first end, a second end and an intermediate portion therebetween, said impinger including a first aperture disposed at said second end and a second aperture disposed at said intermediate portion, said impinger defining an internal passageway, wherein a first end of said internal passageway terminates at the first aperture of said impinger, wherein said impinger second end having a diameter larger than a diameter of said impinger intermediate portion;

wherein said mixing head having an aperture extending from a first side of said mixing head to an intermediate position of said first mixing passageway, said aperture in communication with said first mixing passageway;

wherein said impinger disposed within said mixing head aperture and a portion of said first mixing passageway.

16. The applicator of claim 15 wherein the diameter of the second end of said impinger is chosen such that it effectively seals communication between said first mixing passageway and said outlet passageway.

17. The applicator of claim 15 wherein the diameter of the second end of said impinger is slightly smaller than a diameter of said first mixing passageway at its second end such that a seal is created at the second end of the first mixing passageway and any material flowing into said first mixing passageway from said first material passageway is directed through said second aperture of said impinger into said impinger internal passageway and out said first aperture of said impinger into said outlet passageway.

18. The applicator of claim 15 wherein the size of said first impinger aperture is chosen such that an amount of pressure for material flowing into said outlet passageway from said impinger internal passageway is essentially equal to an amount of pressure for material flowing into said outlet passageway from said second mixing passageway.

19. A method for mixing and applying multiple materials comprising the steps of:

(a) providing a first material through a first tubing member into a first mixing passageway of a mixing head;

(b) providing a second material through a second tubing member into a second mixing passageway of the mixing head;

(c) directing the first material out of the first mixing passageway at a first internal end of an outlet passageway of the mixing head and directing the second material out of the second mixing passageway at the first internal end of the outlet passageway such that the first material and second material meet at the first internal end and begin to be at least partially mixed together within the outlet passageway; and (d) spraying the mixed composition consisting of the first material and the second material out of a tip in communication with the outlet passageway.

20. The method of claim 19 further comprising the step of directing the mixed material through a static mixer prior to spraying.

21. The method of claim 20 wherein step (c) includes the step of delivering the first material and second material into the outlet passageway at essentially the same pressure.

22. The method of claim 19 wherein step (c) includes the step of delivering the first material and second material into the outlet passageway at essentially the same pressure.

23. A mixing head for use with a spray apparatus, comprising:

a body member having a first inlet passageway and a second inlet passageway and an outlet passageway, said outlet passageway having a first internal end and a second external end, said first inlet passageway in communication with said outlet passageway at the first internal end, said second inlet passageway in communication with said outlet passageway at the first internal end; wherein a first material flowing through said first internal passageway and a second material flowing through said second internal passageway meet at the first internal end and begin to be at least partially mixed within said outlet passageway.

* * * * *